July 25, 1972  W. B. COLSON ET AL  3,679,384
METHOD FOR FORMING A HONEYCOMB STRUCTURE
Filed May 7, 1970  3 Sheets-Sheet 1
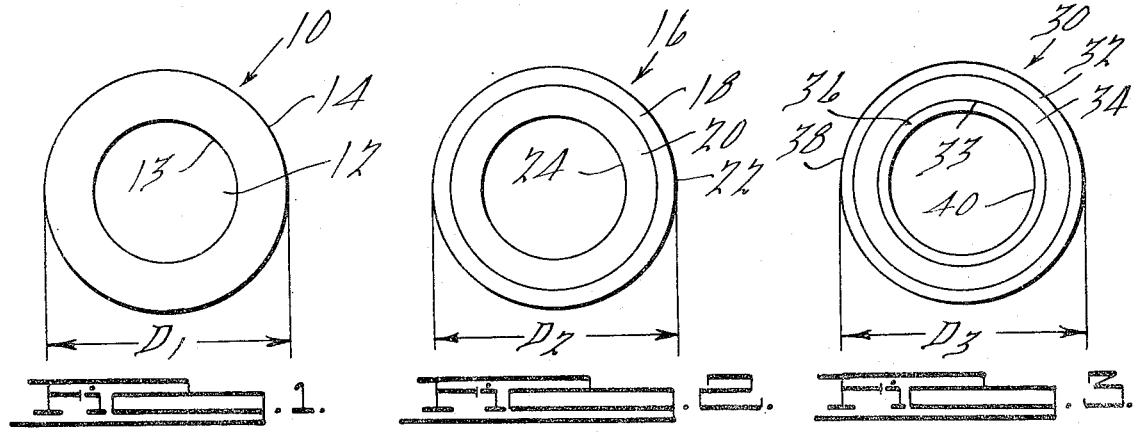
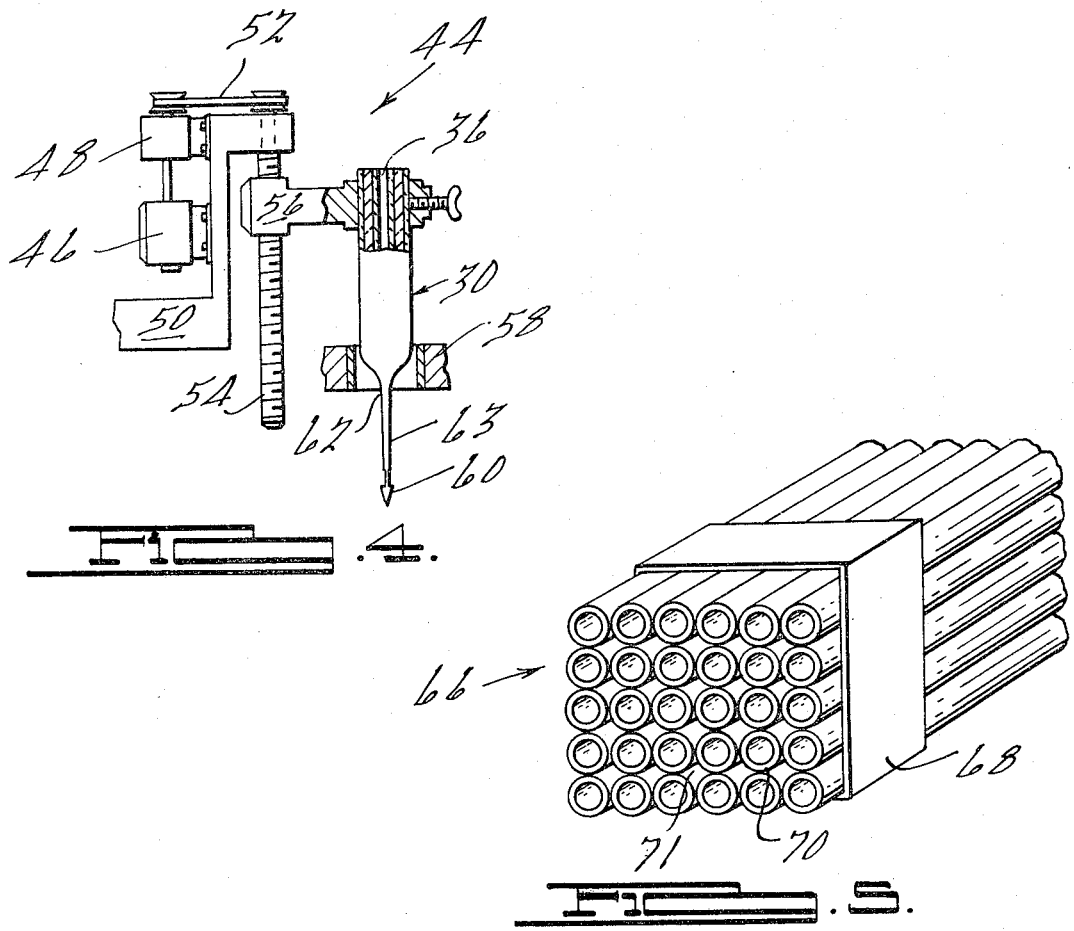
INVENTORS.
William B. Colson
Herbert C. Niedermiller
Bagdasar Deradoorian
ATTORNEY.

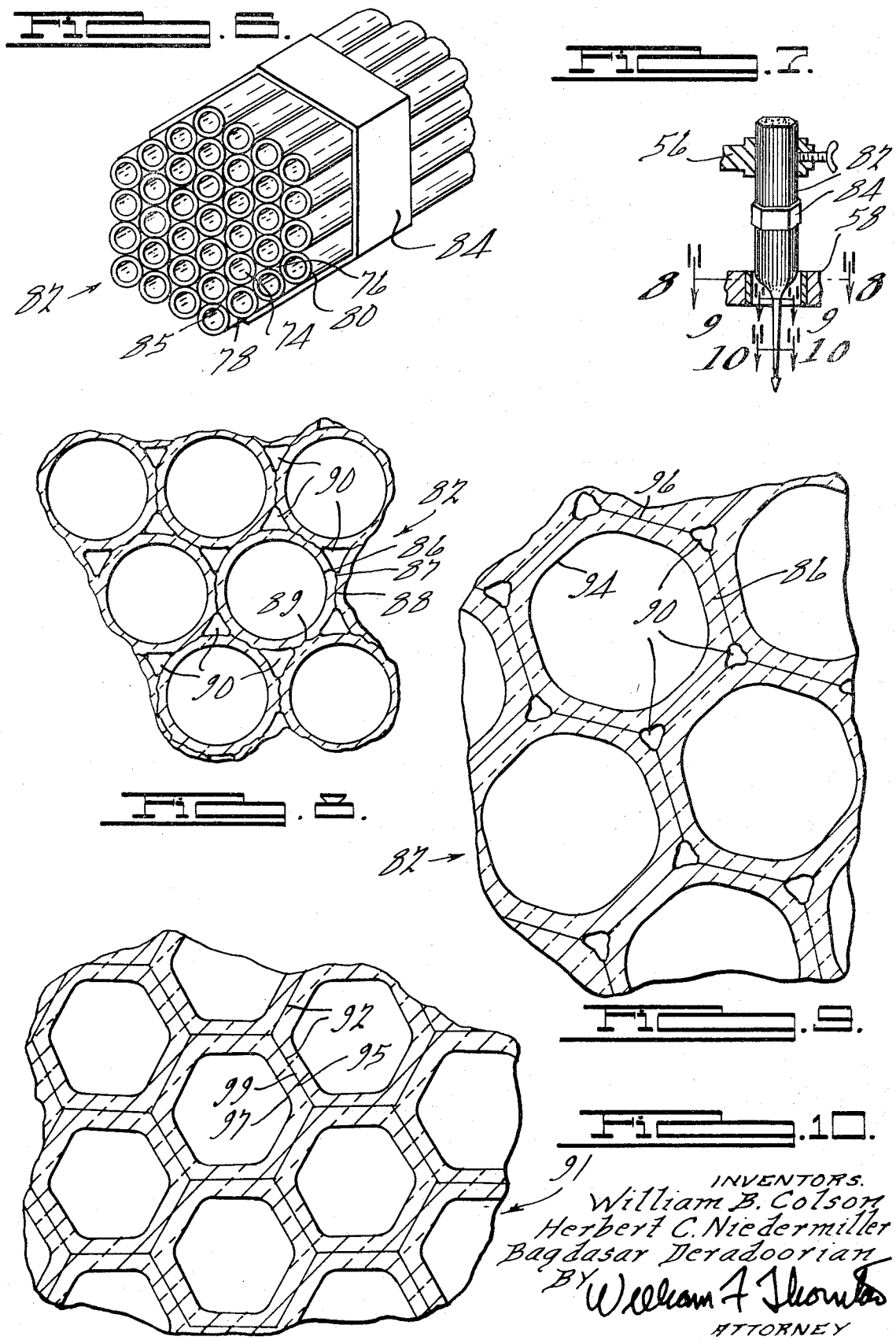

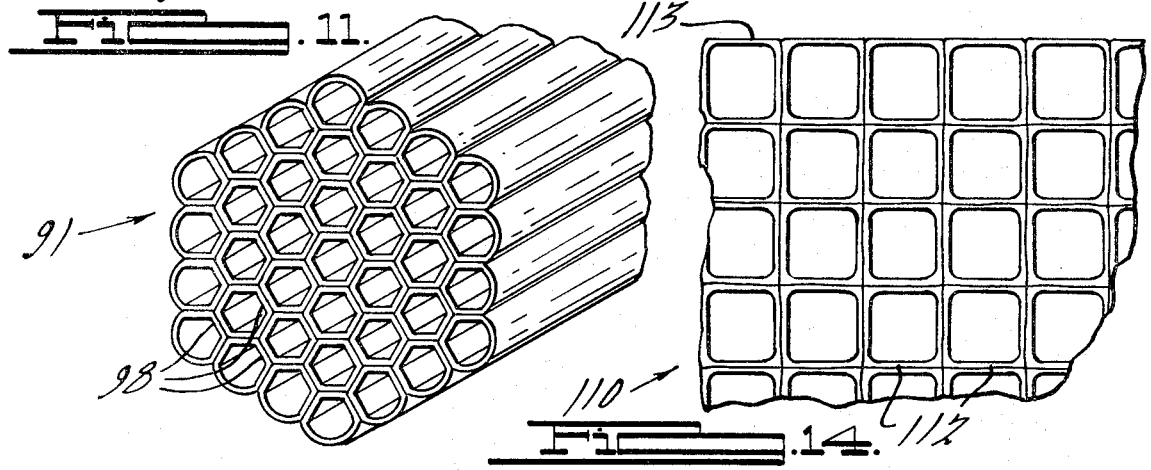
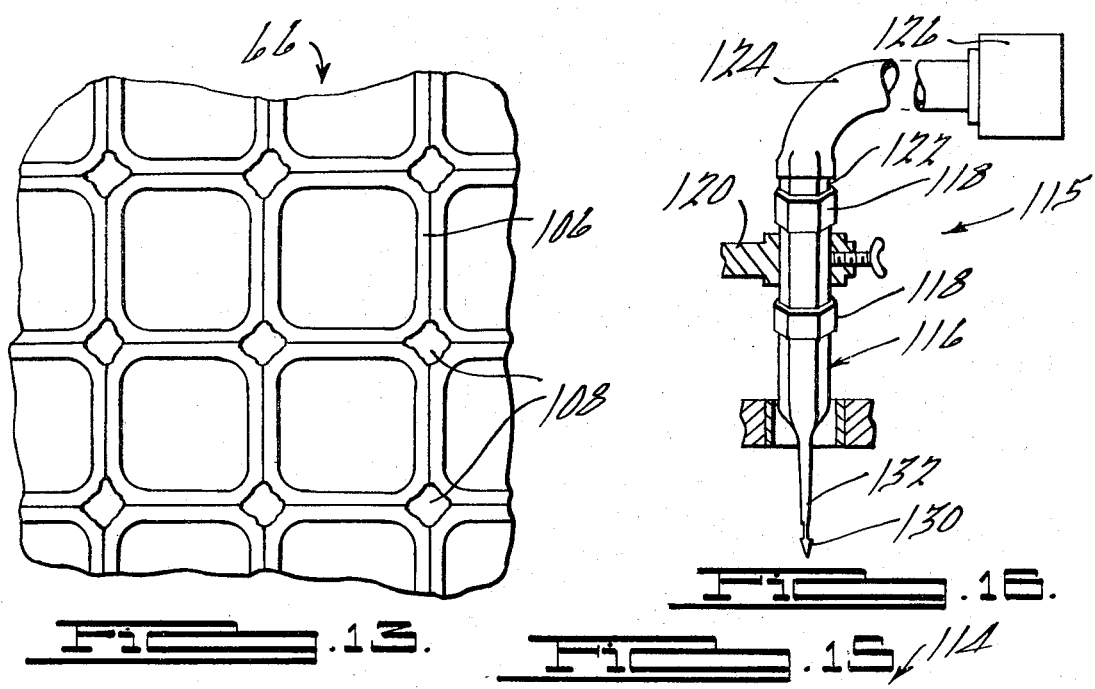
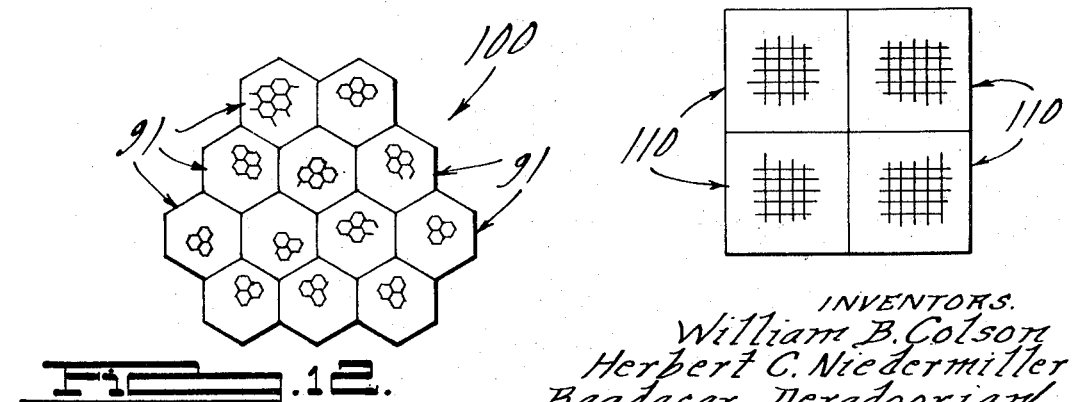

United States Patent Office 3,679,384
Patented July 25, 1972

3,679,384
METHOD FOR FORMING A HONEYCOMB STRUCTURE
William B. Colson, Royal Oak, Herbert C. Niedermiller, Warren, and Bagdasar Deradoorian, Detroit, Mich., assignors to The Bendix Corporation, Southfield, Mich.
Filed May 7, 1970, Ser. No. 35,379
Int. Cl. C03c 25/02
U.S. Cl. 65—4
10 Claims

ABSTRACT OF THE DISCLOSURE

A method for forming a honeycomb structure from glass tubes and the resulting article including arranging the tubes in a stack, heating the stack, and maintaining the interstitial spaces of the stack at a predetermined gas pressure no greater than that of the remainder of the stack, in order to radially expand the individual tubes of the stack and reduce the cross sectional size of interstitial spaces between tubes a predetermined amount. The method can be used to change the cross sectional shape of a round tube of the stack to other shapes such as hexagonal or square.

BACKGROUND OF THE INVENTION

This invention relates to honeycomb structures formed of a plurality of parallel, hollow, tubes and it comprises an improved method of making such a honeycomb structure and the resulting article.

The term "honeycomb structure," as used herein, shall denote a plurality of tube-like elements which have been arranged in a stack and bonded together. The tube-like elements may be of any given outer diameter and the elements need not have any particular cross sectional shape. In addition, tubes having a plurality of different out diameters may be used in the same stack, if desired.

Honeycomb structures are of great importance as a basic component of electron multiplied devices. They do, however, find application as inter alia, fluid filters, gas collimators, flow regulators, fluidic resistors, and chromatographic separation devices.

When used for electron multiplication, a honeycomb structure is positioned between a cathode and an anode in an evacuated chamber. The interior walls of the channels of the honeycomb are coated with a material which is capable of producing secondary electron emission. Electrons from the cathode are directed into the channels of the honeycomb by an accelerating field which extends to the anode. These electrons strike interior walls of the channels of the honeycomb and cause emission of secondary electrons which are accelerated toward the anode by the field. As these emitted electrons travel along the channels, additional secondary electrons result from successive collisions with the channel walls. Thus one or more electrons from the cathode can generate large numbers of secondary electrons in the channels of the honeycomb structure.

If the honeycomb is to be an effective electron multiplier device, it is important that the structure have certain characteristics. For example, the honeycomb should have a minimum of interstitial spaces between adjacent channels. When interstitial spaces are present, electrons from the cathode may be lost in such spaces and never enter the channels of the honeycomb where electron multiplication occurs. In order that as many electrons as possible enter the channels of the honeycomb, it is desirable that the ratio of open channel cross sectional area to total cross sectional area of the honeycomb be as large as possible. In the art, this ratio is known as the open area ratio of the electron multiplier. In addition, for effective electron multiplication the channels should be essentially uniform in terms of width, length, and cross sectional shape throughout the honeycomb if one is to obtain a uniform degree of electron multiplication from all portions of the honeycomb structure. It is important that the honeycomb structure be rigid, solid, and reasonably resistant to breakage.

Throughout this application the term "tube" should be distinguished from the term "channel." The term "tube" is used to describe the tube-like elements which are shown and discussed in detail hereafter in conjunction with FIGS. 1-3. A plurality of tubes are arranged in side by side contacting relationship to form a stack. By processing the stack in accordance with the principles of our invention, the stack is transformed into a honeycomb structure containing a plurality of channels. Our method fuses tubes together, eliminates interstitial spaces therebetween, and expands the tubes radially to thus transform the "tubes" into "channels." Thus a tube of a stack which has been processed in accord with our invention thereafter becomes and is called a "channel."

Most prior art methods for making honeycomb structures for electron multiplication begin by arranging a plurality of round cross section, glass tubes into parallel alignment to form a stack. Ordinarily, these tubes are fabricated of a type of glass which we call "fusing glass" or, alternatively, at least have an outer layer of such glass. In some methods, the tubes have a solid core which is later removed by chemical means such as etching; in other words the tubes are hollow.

The use of solid core tubes to fabricate honeycomb structures for electron multiplication has won considerable acceptance in the art because the added strength and support afforded by the solid core makes it easier to cut, grind, and polish the finished honeycomb structure without damage to the structure. The solid core has been made of etchable glass or an etchable metal which is subsequently removed by chemical means.

Those using solid core tubes have sought to eliminate interstitial spaces in the stack and improve the open area ratio by heating the mechanically pressurizing the outside of the tube stack to thereby force the tubes closer together thus closing the interstitial spaces therebetween. Solid core tubes were helpful during this step because the tubes were not collapsed by pressurization. It was known in the art that the open area ratio could be improved if the tubes could be made to expand radially as the interstitial spaces between tubes closed. The prior art found that a round cross section solid core tube could be made to take on a hexagonal cross section both interiorly and exteriorly when heated and pressurized as described above. A honeycomb structure formed of tubes thus expanded has an improved open area ratio.

The major drawback of using solid core tubes is that the etching operation required to remove the core frequently damages the interior surfaces of the tubes and seriously weakens the honeycomb structure. Frequently, all the core material is not removed from each tube, and this results in a "rough" interior tube surface having obstructions therealong. This can seriously limit the effectiveness of the resulting honeycomb structure as an electron multiplier device because electrons may not pass the obstructions. Not infrequently, the chemical removal process weakens the tube walls thus reducing the strength of the honeycomb. In addition, the chemical removal process can introduce impurities onto the tube walls which may be undesirable for electron multiplier applications which require that the interior tube wall surface be reliably secondary emissive. The present invention overcomes these problems with a new method for forming honeycomb structures which does not require a solid core or chemical removal process.

Hollow core glass tubes have also been widely used to form honeycomb structures. Use of hollow tubes is advantageous in that no etching or chemical core removal is required; thus the interior surface of each tube is smooth and more regular than an etched tube. The difficulty encountered by the prior art in forming honeycomb structures from hollow core tubes was in eliminating interstitial spaces between tubes and increasing the open area ratio of the honeycomb. Some attempted to mechanically compress and heat the stack of hollow glass tubes, but this method was not satisfactory because it caused many tubes, particularly those on the outside of the stack, to collapse. In addition, where interstices were eliminated by such external pressure, the open area ratio of the honeycomb was not substantially increased. Pressurizing the stack closed the interstices, but the interior surfaces of individual tubes did not expand radially to increase the open area ratio of the honeycomb. As indicated earlier, it is very desirable for the interior surface of each tube to expand and take on the same cross sectional configuration as the exterior surface of the tube. One advantageous cross sectional geometry for individual tubes is a hexagon. A hexagon shape facilitates the positioning of individual tubes in close proximity to one another with a minimum of wasted space between tubes and forms a honeycomb with a large open area ratio as will be shown in greater detail hereafter. In recent years, the art has exerted strong efforts to form honeycomb structures having hexagonal channels formed of expanded tubes.

Those skilled in the art have attempted to eliminate interstices and obtain a larger open area ratio for hollow core tubes by simultaneously heating the stack, creating a partial vacuum in the interstitial spaces between hollow tubes, and pressurizing the interior of the tubes. This technique has been used by the prior art to reduce the size of interstitial spaces, but has not been successful in improving the open area ratio because the technique did not radially expand the interior of the individual tubes; in short, before the heating, vacuumizing, and pressurizing were applied, the stack contained hollow tubes of round interior and exterior cross section; after it was applied, the cross section of the exterior periphery of each tube was hexagonal but the cross section of the interior periphery of each tube was still round and essentially unchanged. The closest that prior art methods have come in achieving the elimination of interstitial spaces and the obtaining of a large open area ratio using hollow tubes is a honeycomb structure without interstitial spaces formed of tubes whose exterior peripheries were of hexagonal cross section and whose interior peripheries were of round cross section. It has long been an objective of the prior art to produce honeycomb structures having channels whose interior crosss sectional geometry is similar to the exterior geometry. This objective is attained by our invention.

SUMMARY OF THE INVENTION

This invention comprises a method of making a honeycomb structure from glass-like tubes wherein the cross sections of individual channels of the honeycomb can be made uniform in both size and shape and wherein interstitial spaces between channels can be eliminated if desired. The invention includes the honeycomb structures resulting from the method. By using hollow glass-like tubes of special construction and processing them in accord with the principles of our invention, we have found it possible to create a honeycomb structure having high strength and uniformity. Our method does not require chemical removal processes ordinarily associated with solid core tubes. By arranging the tubes into a stack and processing the tubes in accord with our invention, surface tension forces within the stack are utilized to eliminate interstitial spaces and radially expand each tube of the stack. In this way, the resulting honeycomb structure is urged of interstitial spaces and the open area ratio so important to effective channel electron multiplier operation is greatly increased.

We have discovered that single layer tubes of the proper materials and proportions are extremely sensitive to surface tension forces and when stacked, heated, and drawn in accordance with our method, form a honeycomb structure possessing extremely valuable properties.

In addition, we have found that multi-layer tubes of the proper materials and proportions can be utilized to form the honeycomb structure of our invention with only a slight modification of the method used with single layer tubing.

In practicing our invention, one begins by forming a single or multi-layer tube of the proper proportions and materials. This tube is then heated and drawn to an arbitrarily selected smaller diameter. As the tube is drawn to this reduced diameter, it is cut at regular intervals to produce a plurality of thin, straight, round cross section, hollow tubes. These tubes are arranged in parallel side by side contacting relationship to form a stack which is then heated. During the heating of the stack, interstitial spaces between tubes close due to surface tension forces; simultaneously, the cross section of each tube expands radially and each individual round cross section tube is transformed into a "channel" having a hexagonal cross section both interiorly and exteriorly. These resulting hexagonal cross section channels permit one to obtain a large open area ratio as will be shown hereafter. If single layer tubes are used and it is desired to form a honeycomb structure with hexagonal or square cross section channels, it is necessary during the heating of the stack to create a partial vacuum on the interstitial spaces between the tubes of the stack as will be described hereafter.

If desired, a honeycomb structure having channels of square cross section can be obtained by arranging the round tubes of the stack in an alternative stacking arrangement. The present invention thus provides a simple, expedient, economic method for making a honeycomb structure having a large open area ratio and no interstitial spaces. It provides a method by which honeycomb structures of the type described can be manufactured with great uniformity in size and shape of individual channels which is readily reproducible with minimum attention per unit. Our invention permits the manufacture of a honeycomb structure having smooth interior channel surfaces, no interstitial spaces and channels of uniform size and shape well adapted for use as channel electron multipliers and microchannel plates. The honeycomb structure of the invention is readily combinable with other like honeycomb structures to create a honeycomb structure having a larger number of channels which we shall call a "billet."

In addition, if it is found desirable in a non-electron multiplier application to have interstitial spaces of some given size the invention can be used to provide interstitial spaces of any desired size.

Aside from the use of our honeycomb structures as electron multipliers, they find application as fluid filters, gas collimators, flow regulators, fluidic resistors, and chromatographic separation devices.

The potentially very narrow channels of honeycomb structures like those shown herein are capable of removing extremely small particles from fluid when utilized as a filter.

Since the channels can be aligned in essentially parallel relationship, they are excellent for establishing a parallel flow pattern for a gas passed therethrough. Gas molecules passing through the honeycomb structure emerge in nearly parallel streams from the narrow channels of the honeycomb thus making it an excellent gas collimator.

A honeycomb structure can be used as a flow regulator. Since the channels of the honeycomb can be made extremely narrow and uniform, one can regulate accurately the amount of flow passing through the channels. The narrow channels also make our invention readily usable as a fluidic resistor.

Our honeycomb structures are also useful for chromatographic separation of chemical substances possessing different affinities. By coating the interior of our channels with substances having a high affinity for particular chemical products, a fluid containg such products can be purified by passing the fluid through the honeycomb structure.

BRIEF DESCRIPTION OF THE DRAWINGS

FIG. 1 is a cross sectional view of one type of tube from which the honeycomb structure of our invention can be formed.

FIG. 2 is a cross sectional view of a second type of tube from which a honeycomb structure can be formed.

FIG. 3 is a cross sectional view of a third type of tube useful in practicing our invention.

FIG. 4 is a schematic view of a drawing apparatus useful for drawing reduced diameter tubes from the tubes shown in FIGS. 1, 2, and 3.

FIG. 5 shows a stacking arrangement usable with tubes of the type shown in FIGS. 1-3 to produce one type of honeycomb structure.

FIG. 6 shows a second stacking arangement usable with tubes of the type shown in FIGS. 1-3 to produce a second type of honeycomb structure.

FIG. 7 is a schematic view of a portion of the drawing apparatus of FIG. 4 showing the apparatus being used to produce a honeycomb structure from a stack containing tubes of the type shown in FIGS. 2 and 3.

FIG. 8 is an enlarged cross sectional view of a portion of the stack of FIG. 7 taken along cutting plane 8—8 while the stack is being heated to show the changes in tube structure as a honeycomb structure is formed.

FIG. 9 is an enlarged cross sectional view of a portion of the stack of FIG. 7 taken along cutting plane 9—9 while the stack is being heated to show changes in tube structure subsequent to those shown in FIG. 8.

FIG. 10 is an enlarged cross sectional view of a portion of the stack of FIG. 7 taken along cutting plane 10—10 to show the appearance of the finished honeycomb structure.

FIG. 11 is an enlarged isometric view of a portion of a finished honeycomb structure produced by processing a stack of tubes like that in FIG. 6 in accordance with the principles of our invention.

FIG. 12 is a cross sectional view showing a plurality of honeycomb structures like the one in FIG. 11 combined to form a billet.

FIG. 13 is an enlarged cross sectional view of a portion of a stack like that shown in FIG. 5 taken while the stack is being processed in accordance with our invention to produce a honeycomb structure having channels of square cross section.

FIG. 14 is an enlarged cross sectional view of a portion of a completed honeycomb structure incorporating the stacking arrangement shown in FIG. 5.

FIG. 15 is a cross sectional view showing a plurality of honeycomb structures like the one shown in FIG. 14 combined to form a billet.

FIG. 16 is a schematic view of a portion of the drawing apparatus of FIG. 4 showing the apparatus being used in cooperation with an evacuating pump to produce a honeycomb structure from a stack containing tubes of the type shown in FIG. 1.

DETAILED DESCRIPTION AND OPERATION OF THE INVENTION

This invention comprises a method by which improved honeycomb structures can be made, such as those shown in FIGS. 11 or 14; the invention also includes the resulting honeycomb structures obtained by the method.

We have found glass an excellent material from which to form our honeycomb structures, but it is not essential that glass be used. Any material having "glass-like" properties is acceptable. The term "glass-like" as used herein designates noncrystalline materials which gradually become less viscous when heated, but which become relatively solid when the heating ceases. In short, the material selected, like glass, should have a relatively broad temperature range over which it gradually becomes less viscous. A list of usable glass-like materials would include plastics and commercial glasses. Throughout this description we shall often speak of glass tubes being used to practice the invention; it should be understood, however, that other materials possessing "glass-like" properties can also be used with our method.

Using our method, honeycomb structures can be formed from hollow, glass tubes. These tubes may be formed of a single type of glass or may have two or more layers of different glasses.

FIG. 1 is a cross section taken through a tube 10 formed of a single type of glass-like material; most any type of glass can be used to form the tube 10. The tube 10 is of round cross section with a hollow core 12. A honeycomb structure can be fabricated from a plurality of these "single layer" glass tubes using our invention. Hereafter we shall refer to tubes formed of a single type of material as "single layer" tubes because they consist of only a single layer of material.

We have found that interstitial spaces between single layer tubes of a stack can be eliminated more effectively if the wall thickness of the single layer tubes is selected such that the ratio of tube wall thickness to outer diameter $D_1$ (FIG. 1) of tube 10 is between 0.01 and 0.25. The term "wall thickness" is here defined as the distance between the inner periphery 13 and the outer periphery 14 of tube 10. We have found that a ratio of wall thickness to outer diameter between 0.08 and 0.12 gives unusally good results with single layer tubes if the honeycomb structure is to be used for electron multiplication.

FIG. 2 is a cross section through a two layer hollow tube 16 useful useful in practicing our invention. The tube 16 has an outer bonding layer 18 which may be formed of what we shall call "fusing glass" and a central matrix layer 20 of "structural material." The term "fusing glass" as used herein refers to glasses having relatively low softening temperatures compared to the "structural material," which will be defined immediately hereafter. With our invention we have found that Corning Type 0120 glass, which is a potash soda lead glass, works well as a fusing glass. The reason we prefer fusing glass is that it is an effective means to easily bond or fuse adjacent tubes together into a honeycomb structure without deforming the tubes when the invention is practiced as will be described hereafter. The outer bonding layer 18 of fusing glass (FIG. 2) can be Corning Type 0120 glass, although other glasses or glass-like materials can also be used.

The term "structural material" as used herein refers to a glass-like material whose function is to provide structural support for the tube. The glass-like material selected must have a viscosity higher than that of the material forming the outer bonding layer 18. A desirable viscosity differential is achieved when the annealing point temperature of the structural material is a temperature approximately 50–200 centigrade degrees greater than the annealing point temperature of the outer bonding layer material. We have found that if the structural material has an annealing point temperature 100 centigrade degrees greater than that of the outer bonding layer, satisfactory results are obtained. The structural material can be selected from a wide variety of available glasses or glass-like materials so long as it meets the above viscosity relationship. It is important that the viscosity of the structural material is higher than the viscosity of the outer bonding layer. When a plurality of tubes are arranged in a stack, the stack will be heated to a temperature sufficient to substantially soften the outer bonding layer 18 of each tube to thereby bond adjacent tubes together; at this temperature the central matrix layer 20 must soften sufficiently, but not as much as the outer layer 18, to permit the layer 20 to expand radially with the outer bonding layer 18 as the outer bonding layers of adjacent tubes bond with one another; thus the central matrix layer 20 expands with the outer bonding layer 18 and takes on the final cross sectional shape of the outer bonding layer 18 as adjacent tubes bond. The structural material selected must soften but not collapse during this heating operation.

The materials forming layers 18 and 20 must have comparable coefficients of thermal expansion so as to be thermally compatible in the temperature range used herein, and it should be understood that it is not essential that a glass be used for the central matrix layer 20. Other "glass-like" materials possessing properties like those set out for the "structural material" are also usable. We have found that Corning Type 0080 glass, which is a soda lime glass, works well as a structural material.

It is helpful to the production of a more uniform honeycomb structure if the ratio of the thickness of the bonding layer 18 (FIG. 2) to the outer diameter $D_2$ of the tube is between 0.005 and 0.15. It is also helpful if the "wall thickness of the tube 16 is kept within certain limits. "Wall thickness" is here defined as the distance between the outer periphery 22 and the inner periphery 24 of the tube 16. The ratio of wall thickness to outer diameter $D_2$ should be between 0.05 and 0.25. For best results, it has been found that the ratio of bonding layer thickness to outer diameter $D_2$ should be between 0.02 and 0.03; an optimum range for the ratio of wall thickness to outer diameter $D_2$ is 0.08 to 0.12.

FIG. 3 is a cross section through a tube 30 having three layers. An outer bonding layer 32 can be formed of fusing glass or of other appropriate glass-like material as before. The central matrix layer 34 is formed of a structural glass-like material of the type already described. The inner layer 36 which is bonded to the inner surface 33 of the central matrix layer 34 is a special-purpose layer which may be a glass or chemical coating. This inner layer 36 may be used to accomplish a variety of special purposes such as secondary electron emission, electrical conduction, establishment of an electric field, or chromatographic separation, all of which will be further discussed hereafter. If the purpose of the inner layer 36 is to provide secondary electron emission, the inner layer should be of a material which is or can be made secondary emissive. The inner layer may also be resistive so as to permit a current to flow therethrough to replenish electrons lost during secondary emission and establish an electric field in the tube 30 to accelerate electrons therealong. Naturally, the materials forming the layers used in the tube 30 should have comparable coefficients of thermal expansion in the temperature range used therewith so as to be thermally compatible with one another.

The tube 30 of FIG. 3 is like the tube 16 of FIG. 2 aside from the addition of the special-purpose inner layer 36. The central matrix layer 34 and the outer bonding layer 32 can be formed of glass-like materials which have their annealing point temperatures approximately 50–200 centigrade degrees apart as was indicated for the tube 16 of FIG. 2. If the annealing point temperatures are 100 centigrade degrees apart, satisfactory results are obtained. The inner special-purpose layer 36 should have a viscosity substantially the same as that of the central matrix layer 34. As before, we intend that the outer bonding layer 32 soften substantially to bond adjacent tubes and that the central matrix layer 34 soften sufficiently to permit the tube 16 to expand radially while the outer layers 32 bond; the thickness and viscosity of the inner layer 36 should be selected such that the inner layer 36 does not restrict the radial expansion of the central layer 34. In addition, it is helpful if the thickness of the outer bonding layer 32 of FIG. 3 is selected such that the ratio of the bonding layer thickness to outer diameter $D_3$ of the tube is between 0.005 and 0.15. It is also helpful if the wall thickness of the tube 30 is kept within limits. "Wall thickness" of the tube 30 is here defined as the distance between the outer periphery 38 and the inner periphery 40. The ratio of wall thickness to outer diameter $D_3$ should be between 0.05 and 0.25. For best results, it has been found that the ratio of bonding layer thickness to outer diameter $D_3$ should be between 0.02 and 0.03; an optimum range for the ratio of wall thickness to outer diameter $D_3$ is 0.08 to 0.12. If two or more inner layers are used in the tube 30 of FIG. 3, the ratios set forth above should still be adhered to produce an improved result.

The tubes shown in FIGS. 1, 2, and 3 commonly have an outer diameter of 1.7 inches. Tubes of this diameter are not ordinarily used to form the final resulting honeycomb structure of our invention because frequently the channels of the honeycomb are required to be of much smaller outer diameter. However, the principles of our invention are applicable to tubes of any outer diameter, and if a honeycomb structure of channels having a relatively large outer diameter is required, our method can be used with large diameter tubes to form the structure. In the event a honeycomb structure of narrow channels is needed, our method has produced honeycomb structures having channels with outer diameters not exceeding one micron. If desired, narrower channels can be obtained therewith. Ordinarily, since a honeycomb structure of narrow channels is desired, the tubes of FIGS. 1–3 are heated and drawn to produce thinner tubes which are of far smaller outer diameter than the tubes of FIGS. 1–3. These thinner tubes are then stacked and processed in accordance with our invention to form a honeycomb structure.

If it is desired to produce a honeycomb structure having channels of uniform size and cross sectional shape, it is advisable to have the tubes of FIGS. 1, 2, or 3 essentially uniform in size and shape. The tubes used to form the honeycomb structure, whether of the type shown in FIGS. 1, 2, or 3, should have uniform outer diameters and the ratios of bonding layer thickness to outer diameter and wall thickness to outer diameter of each tube should correspond. It is especially helpful if the outer diameters of the tubes are the same because it greatly facilitates stacking the tubes with regularity as will be evident hereafter.

Although we have shown our method as being used only with tubes of round cross section, it should be understood that tubes having non-round cross sections can be used with our method to form a honeycomb structure. For example, a tube having a polygonal or elliptical cross section could be used.

FIG. 4 shows a drawing apparatus 44 used to heat and draw a tube of the type shown in FIGS. 1, 2, or 3 to a decreased diameter to thereby produce thinner tubes. A motor 46 is connected through a gear-train 48, both of which are mounted on a support 50. By means of a belt 52, or other linkage device, torque is transmitted from the gear-train to a rotating screw 54.

A tube clamping arm 56 is threadedly attached to rotating screw 54 for movement therealong as the screw rotates. A tube containing 1, 2, 3 or more layers is clamped at the end of the tube clamping arm 56. In the description which follows it will be presumed that the purpose of the honeycomb structure to be produced is to provide a structure for electron multiplication. The tube clamped at the end of arm 56 is here shown as the tube 30 of FIG. 3; it is formed of three layers, the inner layer 36 being a special-purpose layer for electron multiplication. This inner layer 36 is formed of a material which is or can be made secondary emissive. In addition, the inner layer 36 is electrically resistive so that a current will flow along the inner layer 36 to replenish electrons lost by secondary emission and also establish a longitudinal electric field along the tube 30. This type of inner layer is known to the prior art and described in U.S. Pats. 3,128,408 and 3,341,730 to George W. Goodrich et al.

An annular heating unit 58 is positioned around tube 30 such that the tube depends from tube clamping arm 56 approximately coaxially through the heating unit 58. Heating unit 58 may be of any conventional design capable of raising tube 30 to a temperature suitable for drawing in a short zone within the unit 58. A temperature of approximately 600° C. has been found excellent for our purposes when the glasses used are Corning Types 0120 and 0080. The temperature selected, of course, depends on the types of glass used to form the tube 30. Tube clamping arm 56 is advanced by rotating screw 54 in a direction which lowers tube 30 into heating unit 58. As the tube 30 reaches a temperature suitable for drawing, the depending end 62 of the tube 30 is drawn axially by any convenient means well known in the art as indicated by arrow 60 at a rate so controlled as to produce a hollow fiber-like tube 63 of a desired small cross sectional size. We have found it desirable to use a value of drawing force as large as the tube 30 can withstand without breaking. With our method an outer diameter of 0.016" is a convenient size for the tube 63.

Tube 30 at the end of clamping arm 56 is continually lowered into heating unit 58 by rotating screw 54 at a rate selected to keep pace with the removal of material from its depending end 62 as fiber-like tube 63 is progessively formed by drawing. The cross sectional geometry and cross sectional proportions of fiber-like tube 63 are substantially identical to those of tube 30 aside from being of smaller diameter. No substantial change in the already described tube proportions occurs during this drawing operation. The predetermined ratios of wall thickness to outer diameter and bonding layer thickness to outer diameter are not substantially altered by the drawing operation. The resulting fiber-like tube 63 is cut at predetermined lengths to produce a plurality of fiber-like tubes of convenient length for arrangement into a stack. We have found four foot lengths easy to handle and arrange into a stack. If tube 30 is of 1.7 inches outer diameter and four feet long, some 10,000 fiber-like tubes 63 of 0.016 inch outer diameter and four feet long can be formed from such a tube 30.

Fiber-like tubes 63 of practically any desired diametral size can be formed by the single drawing operation shown in FIG. 4. However, when extremely thin tubes, such as those ordinarily used in channel electron multiplier devices are to be formed, these thin tubes are so small as to be almost hair like; this makes such tubes extremely difficult to handle individually. When forming tubes for electron multiplier use we have found it advisable to produce a tube of 0.016 inch outer diameter using a first drawing operation as shown in FIG. 4; we then arrange the 0.016 inch outer diameter tubes into a stack and perform a second drawing operation on the stack as a whole. Using this procedure, there is no need to handle the very thin individual electron multiplier tubes since they are not produced until a second drawing operation, which will be described hereafter, and then are part of a finished honeycomb structure which can be conveniently handled.

After forming the many 0.016" outer diameter, round cross section tubes with the drawing operation shown in FIG. 4, the tubes are arranged in parallel side by side contacting relationship with one another to form a stack of the type shown in either FIG. 5 or 6. It should be understood that the stacks shown in FIGS. 5 and 6 consist of loose individual tubes which are not yet bonded together. The tubes which form these stacks are held together by one or more forms to prevent the stack from collapsing prior to bonding.

We have found that two different types of honeycomb structures can be obtained depending on the stacking arrangement selected. One type of honeycomb structure is shown in FIG. 14 and contains channels 112 of square cross section. The second type of honeycomb structure is shown in FIG. 11 and contains channels 98 of hexagonal cross section. If the stacking arrangement of FIG. 5 is used, the resulting honeycomb structure will be that of FIG. 14. If the stacking arrangement of FIG. 6 is selected, the resulting honeycomb structure will be that of FIG. 11.

If it is desirable that the cross section of the individual channels of the finished honeycomb structure be square, a stack 66 (FIG. 5) is assembled within a form 68 with tubes in side by side contacting relationship with one another such that the central axes of all tubes are parallel, and each interior tube, such as tube 70, is in contact with four adjacent tubes such that the lines of contact between tube 70 and the four adjacent tubes are spaced around the periphery of the tube 70 at intervals of approximately $\pi/2$ radians from one another.

The number of tubes used to form the stack 66 of FIG. 5 can be varied according to the number of channels required in the resulting honeycomb structure since each tube of the stack forms a channel of the honeycomb structure. The stack 66 contains many interstitial spaces such as interstitial space 71. It is very desirable to eliminate these interstitial spaces if the honeycomb structure is to be used for electron multiplication. When interstitial spaces are present, electrons directed toward the honeycomb structure may enter the interstitial spaces instead of the channels. Such electrons are not multiplied and the overall result is that weak inputs of only a few electrons may not enter any channel. If these interstitial spaces can be closed and the channel openings expanded thus producing an improved open area ration, the likelihood of an electron entering a channel and of it being mutiplied is thus increased. This is one of the major purposes of our invention.

The form 68, which helps hold the stack 66 together, can be of any size adequate to accommodate the number of tubes which will make up the stack 66. The cross section of the form can be square or rectangular. The honeycomb structure resulting from the stacking arrangement of FIG. 5 is easily combined with other like honeycomb structures to form a group of honeycomb structures called a "billet" as will be described hereafter. By using a form 68 it is possible to produce honeycomb structures which are essentially identical to one another which can easily be fitted together to form a billet.

If it is desired that a honeycomb structure be formed having channels of hexagonal cross section, the stacking arrangement shown in FIG. 6 is used. In FIG. 6 the tubes of adjacent rows are arranged in a stack 82 such that the tubes of one row nest within the troughs formed between tubes of the adjacent row. Thus, each interior tube such as tube 74 is in contact with six adjacent tubes. Tube 74 nests in the trough 76 formed between tubes 78 and 80. Thus, the tubes are arranged in a stack 82 in side by side contacting relationship such that the central axes of all tubes are parallel and each interior tube's lines of contact with adjacent tubes are spaced around the periphery of the interior tube at intervals of approximately $\pi/3$ radians. The stack 82 has many interstitial spaces such as interstitial spaces such as interstitial space 85, but these can, if desired, be eliminated hereafter.

Often it is necessary to combine the honeycomb structures of our invention with other like structures in order to produce a "billet" which in essence is a larger honeycomb structure. This combining operation is made easier if the honeycomb structures obtained from the stacking arrangement of FIG. 6 have a similar outer geometrical configuration. Accordingly, the form 84 permits one to form essentially identical honeycomb structures having hexagonal outer cross sections.

After the tubes have been arranged in a stack like that shown in FIG. 5 or 6, the stack is clamped solidly together to prevent its collapse, and placed in the drawing apparatus 44 of FIG. 7. The drawing apparatus 44 is identical to the device shown in FIG. 4 and thus only the parts of the apparatus in direct contact with a stack 82 are shown. For purposes of this description, it will be presumed that a honeycomb structure having hexagonal cross section channels is to be made and thus the stack 82 shown in FIG. 6 is shown mounted in the drawing apparatus 44 of FIG. 7. It should be understood that the stack 82 is still composed of a plurality of thin, round, hollow tubes produced by the drawing operation illustrated in FIG. 4. The stack 82 is shown held together by form 84 (FIG. 7) and suspended from clamping arm 56 which operates as described in conjunction with FIG. 4. An annular heating unit 58 which is identical to the heating unit of FIG. 4 encircles the stack 82. When heating unit 58 is activated, it raises the temperature of the portion of the stack 82 adjacent thereto to a level suitable for drawing. We prefer to heat the stack 82 to a temperature no greater than that needed to draw the stack. In drawing it, we prefer to apply a drawing force which is as large as the tubes of the stack will withstand without breakage. The exact temperature required for a particular stack varies depending on the types of glass used for the tubes. When three layer tubes are used and the glasses forming the outer and central layers are Corning Types 0120 and 0080, respectively, a stack containing approximately 6000 tubes should be heated to about 600° C. At this temperature the depending end 81 of the stack 82 is drawn axially downward in the direction of arrow 83. As the stack 82 moves slowly through the heating unit 58, at a temperature of 600° C., about one hour elapses between the time a portion of the stack enters the unit 58 and the time the portion leaves unit 58 provided the stack is formed of the materials just described (viz, Corning Type 0120 and 0880 glasses and 6000 tubes). The temperature and time may change if the tubes of the stack are formed of other glass-like materials and if the number of tubes in the stack increases or decreases. During this heating operation, the stack is transformed into a honeycomb structure like that shown in FIG. 11 and described in detail hereafter.

We shall now explain in detail the transition through which the stack 82 of FIG. 6 passes as it is transformed into the honeycomb structure shown in FIG. 11.

FIG. 8 is an enlarged cross sectional view of a portion of the stack 82 of FIG. 7 taken along cutting plane 8—8. FIG. 8 shows the outer bonding layers of adjacent tubes of stack 82 substantially softened at the beginning of the transition which eventually alter the cross sectional shape of the tubes and close the interstitial spaces in the stack 82. To explain the changes occurring in FIG. 8, attention is directed to a typical tube 86 which is one of the many three layer tubes forming stack 82. The individual layers of the three-layer tubes forming stack 82 are not shown in FIG. 8 for simplification, but it should be understood for purposes of describing this transition that the tubes of stack 82 have three layers like tube 30 of FIG. 3. The individual layers of the tubes have also been omitted from FIGS. 9–14 for simplification.

The portion of stack 82 adjacent to the heating unit 58 is heated by the unit 58 (FIG. 7) to a temperature where the outer bonding layer of each tube is softened substantially to bond with adjacent tubes and the central matrix layer of each tube is softened sufficiently to permit it to expand radially. If Corning Types 0120 and 0080 glass are used to form the tubes of the stack, this temperature is approximately 600° C.; to completely close interstitial spaces, a given portion of such a stack should spend approximately an hour passing through unit 58. This time may increase or decrease if different glasses are used to form the tubes of the stack. At this temperature the outer bonding layer 87 of the tube 86 (FIG. 8) has substantially softened and begun to merge with the outer bonding layers of adjacent tubes. This "merging" of the outer bonding layers begins at the regions of contact between adjacent tubes such as contact regions 88 and 89. Since the tube 86 is in contact with six adjacent tubes, it has six regions at which bonding begins. Although the bonding of outer layers of adjacent tubes has begun at the stage shown in FIG. 8, it should be noted that the interstitial spaces 90 have not closed completely, and the interior cross section of each tube is still round. If for any reason, one wants the interstitial spaces to remain as shown in FIG. 8, one can stop heating the stack 82 and the interstitial spaces will not be further reduced in size after the bonding layers begin to solidify. In short, the time interval during which heat is applied has a strong effect on the extent to which interstitial spaces close.

As the outer bonding layers soften substantially and begin to merge with the bonding layers of adjacent tubes of stack 82, surface tension forces associated with the softened bonding layers surrounding each interstitial space acts on the glass so as to reduce the cross sectional area of the interstitial space. These surface tension forces cause the gradual closing of interstitial spaces and the radial expansion of the tubes as the heating operation continues. The softened glass surrounding each interstitial space can be considered as behaving just as a narrowed diameter annulus formed of drops of water. Surface tension forces within the water tend to reduce the area of the central "hole" of the annulus and the "hole" will eventually close due to surface tension forces. Surface tension between the outer bonding layer and the central matrix layer of each tube causes the central layer to be pulled outward. Surface tension forces ultimately cause each tube to acquire a hexagonal cross section.

FIG. 9 is an enlarged cross sectional view of a portion of the stack 82 taken along cutting plane 9—9 in FIG. 7 and shows a later stage of the transition occurring in stack 82 subsequent to that of FIG. 8 during which the interstitial spaces further decrease in cross sectional area and the tubes expand radially to take on a hexagonal cross section both interiorly and exteriorly.

In FIG. 9 the cross sectional geometry of tube 86 of stack 82 has changed considerably from its cross section as shown in FIG. 8. The interstitial spaces 90 adjacent tube 86 have diminished considerably in cross sectional area, and the cross sectional geometry of the tube is becoming hexagonal both interiorly and exteriorly. That is, the tube 86 now has six distinct sides on its interior periphery 94 and on its exterior periphery 96. The hexagonal cross section of each tube will become increasingly distinct as the heating is continued.

FIG. 10 is an enlarged cross sectional view of a portion of the stack 82 of FIG. 7 taken along cutting plane 10—10. Plane 10—10 intersects stack 82 at a location when the honeycomb structure of the invention is completely formed.

Referring now to FIG. 10, the interstitial spaces in the honeycomb structure 91 have completely closed, leaving only a series of juncture lines 92 evidencing the seams between adjacent bonded chanels. It should particularly be noted that the individual channels of honeycomb structure 91 have assumed a hexagonal cross section both interiorly and exteriorly; that is, the cross section of the interior periphery 97 of a typical channel 95 is hexagonal, and its exterior periphery 99 is also hexagonal. The channels of the honeycomb structure 91 are solidly bonded together.

FIG. 11 is an enlarged isometric view of the finished honeycomb structure 91 formed by the heating and drawing operation of FIG. 7. It should be noted that the drawing operation of FIG. 7 began with a stack 82 of round cross section tubes; the outer cross section of the stack 82 was hexagonal. The finished honyecomb structure 91 shown in FIG. 11 has an outer cross sectional shape which is essentially hexagonal and the channels 98 have hexagonal cross sections both interiorly and exteriorly. It should be understood that the stack 82 shown in FIGS. 8 and 9 and the finished honeycomb structure 91 of FIGS. 10 and 11 were formed of three layer tubes. The individual layers have been omitted from these figures for simplification.

Although for purposes of description the honeycomb structure 91 of FIG. 11 is shown with only 37 individual hexagonal channels therein, it should be understood that by our method honyecomb structures can be made which possess larger numbers of channels; honeycomb structures having over six thousand channels therein are easily produced by our method.

Referring now to FIG. 11, it should be noted that the layer of channels adjacent to the outer periphery of the honeycomb structure 91 do not have a completely hexagonal cross section. Because there are no surface tension forces acting on portions of the outer tubes of the stack, the radial expansion is not uniform. In practice, a finished honeycomb structure contains thousands of channels and these few irregular outer channels do not seriously affect the performance of the finished honeycomb structure.

Although FIG. 7 showed both heating and drawing, it is not necessary to conduct a drawing operation to produce a honeycomb structure like that of FIG. 11 or 14. All that is required to close the interstitial spaces and expand radially the tubes of stack 82 (FIGS. 7–9) is to heat the stack. The temperature selected should be one adequate to substantially soften the outer bonding layer of each tube and to soften each central matrix layer sufficiently to permit it to expand radially in response to surface tension forces. As indicated earlier, the central matrix layer can be formed of a material which has an annealing point temperature approximately 100 centigrade degrees greater than the annealing point temperature of the outer bonding layer. When Corning Types 0120 and 0080 glasses are used to form the tubes, we have found that a temperature of 600° C. produces excellent results. It should be understood, of course, that if the stack 82 is heated but not drawn, the diameter of the resulting honeycomb structure's channels will not be reduced. If no drawing operation is needed, the honeycomb structure can be formed by heating the stack. A virtually unlimited number of tubes can then be used to form the stack. When it is necessary to also conduct a drawing operation a far more limited number of tubes must be used. The number is large, however, and stacks containing over 10,000 tubes have been drawn and transformed into honeycomb structures using our method.

As shown in FIGS. 8–10, when the stack 82 is heated, the interstitial spaces between adjacent tubes of the stack gradually become smaller until they close completely. The tubes of the stack 82 gradually expand radially and acquire hexagonal cross sections as the interstitial spaces close. The rates at which the interstitial spaces close and the channels expand radially is controlled by temperature. If the temperature is reduced, the rates at which interstitial spaces diminish in size and tubes expand radially decrease. It is thus possible to produce a honeycomb structure having interstitial spaces of any desired size. The cross sectional area of the interstitial spaces is determined by the time interval during which the stack is heated.

The method we have described in FIGS. 7–10 has used three layer tubes. So long as the tubes have at least two layers; namely, an outer bonding layer and a central matrix layer as shown and described in conjunction with FIG. 2, our process requires no external pressure on the stack to create a honeycomb structure. All portions of the stack, including the tube interiors and the interstitial spaces, can be left at the level of the ambient pressure surrounding the stack. The ambient pressure level can, of course, be atmospheric pressure and usually is. We have found, however, that when single layer tubes like the one shown in FIG. 1 are used to form the honeycomb structure of our invention, it is necessary to create a pressure differential between the interior of each tube and the interstitial spaces surrounding the tube in order to expand the single layer tubes radially so as to fabricate a honeycomb structure with hexagonal or square cross section channels therein. This operation will be described further hereafter.

It is possible to combine a plurality of honeycomb structures 91 of the type shown in FIG. 11 to obtain a larger honeycomb structure. FIG. 12 shows four honeycomb structures 91 of the type shown in FIG. 11 stacked into a "billet" 100. After assembling the billet 100 (FIG. 12) the billet is heated to a temperature of approximately 560° C. for approximately an hour to bond the honeycomb structure 91 solidly together. The use of this temperature and time interval is applicable if the tubes are formed of Corning Types 0120 and 0080 glasses as earlier suggested. If other materials are used, the temperature and time may vary from the indicated values. Simultaneously, the honeycomb structures 91 forming the billet 100 are pressed solidly together by any means well known to the art to obtain a tighter fit between structures. A pressure of 15 pounds per square inch works well.

Our process, as described, for the production of honeycomb structures having hexagonal cross section channels is equally applicable to the production of honeycomb structures having square cross section channels. To produce a honeycomb structure with square cross section channels, it is only necessary to substitute the stacking arrangement of FIG. 5 for that of FIG. 6. Referring now to FIG. 5, tubes having two or more layers, as already described, are stacked, in accord with the stacking arrangement shown in FIG. 5. Tubes are placed in side by side contacting relationship with one another within form 68. The form 68 prevents the tubes from collapsing prior to being bonded by the heating operation shown in FIG. 7. With the stacking arrangement of FIG. 5, all tubes have their central axes parallel to one another, and each interior tube such as tube 70 is arranged such that its lines of contact between adjacent tubes are spaced around the periphery of the interior tube 70 at intervals of $\pi/2$ radians from one another.

The stack 66 of FIG. 5 is placed in a drawing apparatus like that shown in FIG. 7. The stack 66 is heated and drawn in the same manner and under the same temperature conditions used for the fabrication of honeycomb structures having channels of hexagonal cross section. As the stack is heated and then drawn in the direction of arrow 83, the outer bonding layer of each tube softens substantially and gradually bonds with the adjacent tubes.

FIG. 13 is an enlarged view of a portion of the stack 66 of FIG. 5 after it has entered the heating and drawing process of FIG. 7. The stack 66 (FIG. 13) is at a temperature where a typical tube 106 has its outer bonding layer softened substantially and its central matrix layer softened somewhat less than the bonding layer; adjacent tubes have begun to bond together, interstitial spaces are closing, and the cross section of individual tubes is becoming increasingly square both interiorly and exteriorly. At this stage interstitial spaces such as 108 are greatly decreased in cross sectional size from their original size as shown in FIG. 5. At the stage of the transition shown in FIG. 13, the adjacent tubes are quite solidly bonded together.

FIG. 14 is an enlarged cross sectional view of a portion of a completed honeycomb structure 110 having channels 112 of square cross section. The honeycomb structure 110 no longer has interstitial spaces between adjacent channels 112, these have been eliminated and the tubes have expanded radially, due to the effect of surface tension forces already described in conjunction with FIGS. 8–11, to take on square cross sections. As a result of our described process, a sturdy honeycomb structure 110 has been produced in which interstitial spaces have been eliminated and the open area ratio improved. In addition, it should be noted that the outer edge 113 of the honeycomb structure 110 is also essentially flat and uniform. These features are helpful when a plurality of honeycomb structures 110 are combined to form a "billet" because the structures "stack" together with a minimum of gaps between the structures.

A square cross section honeycomb structure 110 like that shown in FIG. 14 is easily combined with other like honeycomb structures to form a "billet" 114 (FIG. 15). The square cross section channels of honeycomb structure 110 (FIG. 14) readily facilitate joining a plurality of such structures together. If a billet 114 is to be formed of such structures, the structures are arranged compactly together and the resulting billet heated to a temperature of approximately 560° C. for approximately an hour. Simultaneously with the heating, the outside of the billet is pressurized at a pressure of 15 p.s.i. so as to achieve a tighter fit between the structures making up the billet. The structures bond solidly together and a billet containing a large number of channels is formed. The suggested temperatures, pressures, and times presented above are those used when the tubes are formed of types 0120 and 0080 glasses as described earlier. Different values may be required for tubes formed of other materials.

Thus far we have described our method for forming honeycomb structures as used with three-layer tubes. It should be understood that the method described works equally well with the two layer tubes shown in FIG. 2. The presence of the inner layer of special-purpose material in our tubes does not adversely affect the operation of our method. When heat is applied to a stack of three layer tubes, the inner layer behaves as if it were a part of the central matrix layer of the tube. As interstitial spaces close and the tubes expand radially to fill the interstitial spaces, the inner layer of each tube adheres to and expands with the central matrix layer.

Up to this point in the description of our invention, we have described the operation of our method when tubes having two or more layers were used to form the honeycomb structure. We shall now discuss in detail our method for forming honeycomb structures from single layer tubes like the ones shown in FIG. 1.

FIG. 16 shows a drawing apparatus 115 which can be used to form a honeycomb structure from single layer tubes. Referring now to FIG. 16, a stack 116 of single layer tubes with forms 118 therearound to hold the unbonded stack together is supported by clamping arm 120. The arm 120 is associated with a rotating screw, motor, and gear-train like those shown in FIG. 4. These components have been omitted from FIG. 16 for simplification. The operation of the drawing apparatus 115 of FIG. 16 is identical to that of FIG. 4 except as indicated hereafter.

The stacking arrangement used in stack 116 can be that of FIG. 5 or FIG. 6 depending on whether square or hexagonal cross section channels, respectively, are desired in the resulting honeycomb structure. For purposes of illustration, the stacking arrangement of FIG. 6 will be used in describing the method by which honeycomb structures are formed with the apparatus 115 of FIG. 16. Accordingly, the method to be explained in conjunction with FIG. 16 will produce a honeycomb structure having hexagonal cross section channels.

When single layer tubes are used to form the honeycomb structure of our invention, it is necessary to establish a pressure differential between the interstitial spaces of the stack and the interiors of the tubes. This is done by permitting the tube interiors to remain at the ambient pressure surrounding the stack, which ordinarily is atmospheric pressure, while evacuating the interstitial spaces between tubes to a subambient pressure which ordinarily is a pressure slightly less than atmospheric presure, such as approximately 13 pounds per square inch.

To establish the pressure differential the following procedure is followed. Since it is desired to evacuate the interstitial spaces but not the tube interiors, it is necessary to treat the stack 116 with a sealing compound prior to its insertion in clamping arm 120. And end 122 of the stack 116 is dipped into a liquid sealing compound which does not lose its sealing properties when heated. This liquid sealant penetrates into the tubes and interstitial spaces of the stack 116 by capilliary action. Since capillary action is more efficient within the tubes than within the interstitial spaces, the sealant penetrates further into the tubes than into the interstitial spaces. After the sealant in the stack has hardened a slice is cut off the end 122 of the stack at a location beyond the deepest penetration of the sealant into the interstitial spaces but short of the level of penetration of sealant into the tubes. This results in a stack with the channels blocked and the interstitial spaces unobstructed at the end 122 of the stack. The opposite end 132 of the stack is not sealed. End 122 of the stack is attached to a hose 124 which is connected to a vacuum pump 126. The stack is clamped to the end of arm 120.

Heat is applied to the stack 116 by annular heating unit 128 and the temperature of the portion of the stack adjacent unit 128 is raised to approximately 600° C. if the tubes are formed of Corning Type 0120 glass. At this temperature the drawing operation begins, and the lower end 132 of stack 116 is slowly drawn downward in the direction of arrow 130 to decrease the diameter of the tubes of stack 116. The drawing force and drawing time can be those used for drawing the two and three layer tubes which were described in conjunction with FIG. 7. As the stack 116 is heated and drawn, vacuum pump 126 is activated to evacuate the interstitial spaces within the stack 116. It should be noted that since the end 132 of stack 116 has not been sealed, an influx of gas molecules enters the interstitial spaces of the stack from the unsealed end 132. However, because of the narrowed diameter of the stack 116 adjacent end 132 due to the drawing operation, the influx of gas molecules is low enough to make it possible to sufficiently evacuate the interstitial spaces despite the influx. As the stack 116 is heated, the gases within the tube interiors expand and escape at the unsealed end 132 of the stack; thus the interiors of the individual tubes of stack 116 are maintained at the ambient pressure surrounding the stack 116, while the interstitial spaces are evacuated. The single layer tubes soften during the heating process, and the pressure differential causes the tubes to expand radially and interstitial spaces to close.

The transition stages through which the stack 116 of single layer tubes passes in becoming a finished honeycomb structure like that shown in FIG. 11 are identical in appearance to the stages already described and illustrated in FIGS. 8–11 for two and three layer tubing, and will not be described in detail. The transition stages for the formation of a honeycomb structure having square cross section channels when single layer tubes are used are identical to the stages shown in FIGS. 13 and 14 and discussed in conjunction therewith. It should be understood that it is not essential to conduct a drawing operation such as that shown in FIG. 16 to form a honeycomb structure like that of FIG. 11 or 14 using single layer tubes. All that is required is that the stack 116 be heated to an appropriate temperature and that the interstitial spaces within the stack be evacuated. The drawing operation is conducted only to decrease the diameter of the tubes within the stack. The size of interstitial spaces can be controlled by varying the heating period as was true for two and three layer tubes.

If one wishes to form a honeycomb structure having square cross section channels using single layer tubes, the foregoing method for single layer tubes is equally applicable; the only departure required from the described method is to substitute the stacking arrangement of FIG. 5 for that of FIG. 6. The stack is then processed by the apparatus of FIG. 16 and the stack passes through the transition stages shown in FIGS. 13 and 14 to form a honeycomb structure like that shown in FIG. 14.

If it is desired to fabricate a honeycomb structure larger than the structure produced by the method of FIG. 16, it is possible to assemble a plurality of the honeycomb structures formed by the method of FIG. 16 into a billet like that described earlier. The method described and shown in conjunction with FIGS. 12 and 15 for two and three layer tubing is equally applicable when single layer tubing is used to form the honeycomb structure.

It should be understood that when single layer tubes are used for forming a honeycomb structure, our method requires a pressure differential between tube interiors and interstitial spaces in order to close interstitial spaces and expand the tubes radially. It is not necessary to have a pressure differential when two or three layer tubes are used to form the stack. We have found, however, that when a pressure differential is applied to a stack of heated two and three layer tubes, the process of forming a honeycomb structure takes less time than when no pressure differential is used. In addition, when a pressure differential is used with two and three layer tubes the range of values for the ratio of wall thickness to outer diameter is expanded.

After a finished honeycomb structure has been formed from either one, two, or three layer tubes in accordance with our method, it is necessary to take a number of additional steps before the honeycomb structure is usable as an electron multiplier. Frequently, a plurality of our honeycomb structures are fused together into a billet to form an electron multiplier containing millions of individual channels. Such a multiplier may contain several hundred or thousand honeycomb structures of the type shown in FIG. 11 or 14. The billet is ordinarily about two inches long. Since this length is unnecessary for effective electron multiplication, the billet is sliced into a plurality of thin wafers.

These wafers are processed in accord with known principles in the electron multiplier art to complete the electron multiplier. Such processing may include such steps as chemically treating the special-purpose inner layer of the channels to make the inner layer secondary emissive; it ordinarily includes cleaning and polishing of the wafer, and the adding of electrodes thereto. These additional steps are known to the art and are described in further detail in U.S. Pats. 3,128,408 and 3,341,730 to George W. Goodrich et al.

Although we have described particular steps in the method of our invention for purposes of illustration, it is to be understood that our invention includes all modifications and equivalents which fall within the scope of the appended claims.

We claim:

1. A method for forming a honeycomb structure from tubes comprising:
   arranging a plurality of tubes made of glass-like material in side by side contacting relationship with one another to form a stack having interstitial spaces between the tubes;
   sealing the ends of said tubes while leaving the ends of said interstitial spaces open; removing the ambient gases from said interstitial spaces to thereby lower the pressure in said spaces and thus create a pressure differential between said tubes and said spaces; and
   heating the stack to a temperature sufficient to soften the glasslike material while the stack is maintained at the said gas pressures to thus form a honeycomb structure so that surface tensions cause all contiguous sides of adjacent tubes to move together and close said interstitial spaces.

2. The method according to claim 1 wherein the tubes have ratios of wall thickness to outer diameter between 0.01 and 0.25.

3. The method according to claim 2 wherein said ratio is between 0.08 and 0.12.

4. The method according to claim 1 wherein the stack is drawn to a reduced diameter while being heated.

5. The method according to claim 1 wherein said tubes are hollow and are formed of an outer bonding layer and a central matrix layer of thermally compatible glass-like materials, the outer bonding layer material having a lower viscosity than the central matrix layer glass so that when the tubes of the stack are heated the outer bonding layers soften substantially to bond adjacent tubes together while the central matrix layers soften sufficiently to permit tubes to expand radially.

6. The method according to claim 5 wherein the material of the central matrix layer has an annealing point temperature between 50 and 200 centigrade degrees higher than the annealing point temperature of the material of the outer bonding layer.

7. The method according to claim 5 wherein a plurality of tubes have the ratio of outer bonding layer thickness to outer diameter between 0.005 and 0.15, and the ratio of wall thickness to outer diameter between 0.05 and 0.25.

8. The method according to claim 5 wherein the plurality of tubes have the ratio of outer bonding layer thickness to outer diameter between 0.02 and 0.03, and the ratio of wall thickness to outer diameter between 0.08 and 0.12.

9. The method of claim 1 wherein said sealing of said interstitial spaces is accomplished by:
   exposing said spaces and said tubes to a sealant so that by capillary action said sealant enters said tubes to a first depth and said spaces to a second lesser depth; and slicing said stack between said first and second depths.

10. The method of claim 1 wherein said tubes are made of a single layer of said glass-like material.

References Cited
UNITED STATES PATENTS

| | | | |
|---|---|---|---|
| 1,926,552 | 9/1933 | Morgan | 65—LR DIG #7 |
| 2,608,722 | 9/1952 | Stuetzer | 65—LRD #7 |
| 3,275,428 | 9/1966 | Siegmund | 65—LRD #7 |
| 3,294,504 | 12/1966 | Hicks, Jr. | 65—LRD #7 |
| 3,331,670 | 7/1967 | Cole | 65—4 |
| 3,269,817 | 8/1966 | Bondley | 65—LRD #7 |
| 2,992,516 | 7/1961 | Norton | 65—4 X |
| 3,350,183 | 10/1967 | Siegmund et al. | 65—4 |
| 3,216,807 | 11/1965 | Woodcock | 65—LRD #7 |
| 3,380,817 | 4/1968 | Gardner | 65—LRD #7 |

FRANK W. MIGA, Primary Examiner

U.S. Cl. X.R.

65—DIG 7, 32

UNITED STATES PATENT OFFICE
CERTIFICATE OF CORRECTION

Patent No. 3,679,384      Dated July 25, 1972

Inventor(s) William B. Colson, et. al.

It is certified that error appears in the above-identified patent and that said Letters Patent are hereby corrected as shown below:

Column 18, lines 31 and 32, "said interstitial spaces" should read -- the ends of said tubes -- .

Signed and sealed this 5th day of June 1973.

(SEAL)
Attest:

EDWARD M. FLETCHER, JR.
Attesting Officer

ROBERT GOTTSCHALK
Commissioner of Patents